(12) United States Patent
Cohen et al.

(10) Patent No.: US 11,748,995 B2
(45) Date of Patent: Sep. 5, 2023

(54) OBJECT STATE TRACKING AND PREDICTION USING SUPPLEMENTAL INFORMATION

(71) Applicant: Toyota Research Institute, Inc., Los Altos, CA (US)

(72) Inventors: Schuyler H. Cohen, Ann Arbor, MI (US); Noah J. Epstein, Cambridge, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 335 days.

(21) Appl. No.: 17/036,821

(22) Filed: Sep. 29, 2020

(65) Prior Publication Data

US 2022/0101019 A1 Mar. 31, 2022

(51) Int. Cl.
*G06T 7/20* (2017.01)
*B60W 60/00* (2020.01)
*B60W 30/095* (2012.01)
*G06V 20/56* (2022.01)

(52) U.S. Cl.
CPC ......... *G06V 20/56* (2022.01); *B60W 30/0956* (2013.01); *B60W 60/0027* (2020.02); *G06T 7/20* (2013.01); *B60W 2420/42* (2013.01); *B60W 2420/52* (2013.01); *B60W 2554/20* (2020.02); *B60W 2554/404* (2020.02); *B60W 2554/4029* (2020.02); *G06T 2207/30252* (2013.01)

(58) Field of Classification Search
None
See application file for complete search history.

(56) References Cited

U.S. PATENT DOCUMENTS

| | | | |
|---|---|---|---|
| 9,495,602 B2 | 11/2016 | Okumura | |
| 2016/0132728 A1 | 5/2016 | Choi | |
| 2016/0214647 A1 * | 7/2016 | Weisswange | B62D 15/029 |
| 2017/0177937 A1 | 6/2017 | Harmsen et al. | |
| 2017/0277195 A1 * | 9/2017 | Frazzoli | B60W 60/0015 |
| 2018/0032082 A1 * | 2/2018 | Shalev-Shwartz | G01C 21/3602 |
| 2018/0374360 A1 | 12/2018 | Miao et al. | |
| 2019/0310654 A1 | 10/2019 | Halder | |
| 2019/0369616 A1 | 12/2019 | Ostafew | |
| 2021/0063179 A1 * | 3/2021 | Hayes | G01C 21/3691 |

* cited by examiner

*Primary Examiner* — Idowu O Osifade
(74) *Attorney, Agent, or Firm* — Christopher G. Darrow; Darrow Mustafa PC

(57) ABSTRACT

System, methods, and embodiments described herein relate to predicting a future state of an object detected in a vicinity of a vehicle. In one embodiment, a method for predicting a state of an object includes detecting, at a plurality of discrete times [t, t−1, t−2, . . . ], a respective plurality of states of the object, obtaining, based at least in part on a present location of the vehicle, supplemental information, associated with an environment of the present location, that indicates at least a speed reduction factor, executing a prediction operation to determine a predicted state of the object at a time t+1 based at least in part on the detected plurality of states and the supplemental information, determining an actual state of the object at a time t+1 based on data from the one or more sensors, and modifying the prediction operation based at least in part on the actual state.

20 Claims, 5 Drawing Sheets

OBJECT STATE TRACKING AND PREDICTION USING SUPPLEMENTAL INFORMATION

TECHNICAL FIELD

The subject matter described herein relates, in general, to systems and methods for predicting a state of a detected object, and, more particularly, to using supplemental information to improve accuracy in predicting future states of a detected object.

BACKGROUND

Object detection and tracking in a vehicle context is increasing in importance as autonomous and semi-autonomous vehicles grow more widespread in use. Autonomous and semi-autonomous systems typically must be able to track a state (e.g., speed, position, trajectory, etc.) of a detected object and react safely and appropriately to avoid collisions or observe understood driving conventions such as yielding right of way, etc. The speed and accuracy of determining an appropriate response to a given situation can be improved by predicting a future state of a detected object. Conventional object tracking systems for vehicles use various types of sensors to detect and track location, speed, lane, etc. of objects (e.g., other vehicles, pedestrians, etc.) located in a vicinity of a vehicle. However, sensor data alone may not be sufficient to generate predictions that are accurate enough to be useful in any vehicle decision making process that requires an extremely low margin of error.

SUMMARY

The disclosed systems and methods provide an improved object tracking system for a vehicle that can utilize supplemental information to accurately predict a future state of a detected object.

In one embodiment, an object tracking system for predicting a state of an object includes one or more sensors to detect, at a plurality of discrete times [t, t−1, t−2, . . . ], a respective plurality of states of an object in a vicinity of the vehicle. The object tracking system further includes one or more processors and a memory, communicably connected to the one or more processors, storing: an information module including instructions that when executed by the one or more processors cause the one or more processors to obtain, based at least in part on a present location of the vehicle, supplemental information, associated with an environment of the present location, that indicates at least a speed reduction factor, a prediction module including instructions that when executed by the one or more processors cause the one or more processors to determine a predicted state of the object at a time t+1 based at least in part on the detected plurality of states and the supplemental information, and a correction module including instructions that when executed by the one or more processors cause the one or more processors to determine an actual state of the object at a time t+1 based on data from the one or more sensors, and to modify an operation of the prediction module based at least in part on the actual state.

In another embodiment, a method for tracking an object and predicting a future state of the object includes detecting, at a plurality of discrete times [t, t−1, t−2, . . . ], a respective plurality of states of the object, obtaining, based at least in part on a present location of the vehicle, supplemental information, associated with an environment of the present location, that indicates at least a speed reduction factor, executing a prediction operation to determine a predicted state of the object at a time t+1 based at least in part on the detected plurality of states and the supplemental information, determining an actual state of the object at a time t+1, and modifying the prediction operation based at least in part on the actual state.

In another embodiment, a non-transitory computer-readable medium for tracking an object and predicting a future state of the object includes instructions that, when executed by one or more processors, cause the one or more processors to detect, at a plurality of discrete times [t−2, t−1, t, . . . ], a respective plurality of states of the object, obtain, based at least in part on a present location of the vehicle, supplemental information, associated with an environment of the present location, that indicates at least a speed reduction factor, execute a prediction operation to determine a predicted state of the object at a time t+1 based at least in part on the detected plurality of states and the supplemental information, determine an actual state of the object at a time t+1, and modify the prediction operation based at least in part on the actual state.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
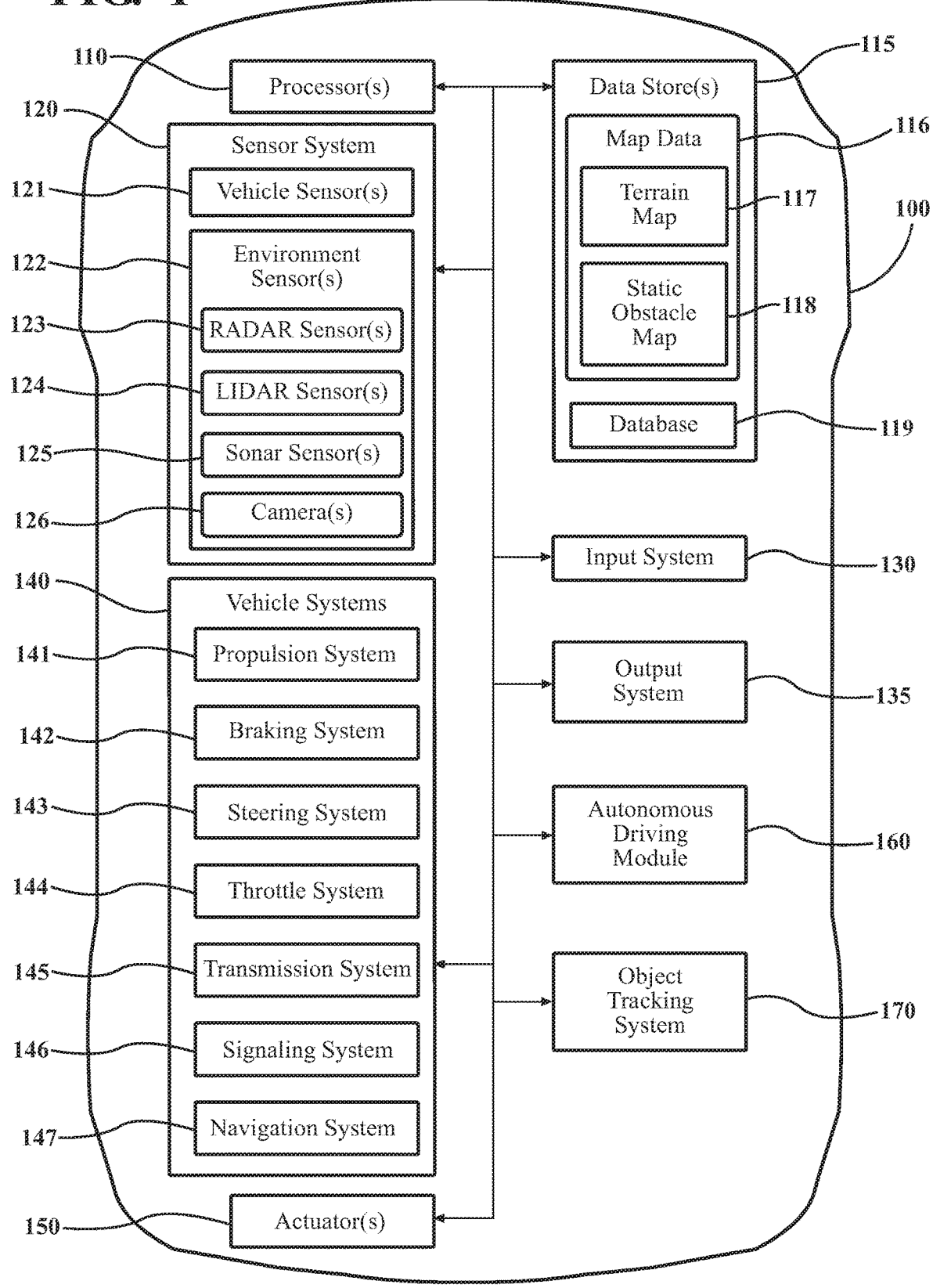
FIG. 1 illustrates one embodiment of a vehicle within which systems and methods disclosed herein may be implemented.

Systems, methods, and embodiments associated with tracking an object and predicting a future state of the object are disclosed. The disclosed embodiments can utilize historical sensor data and one or more types of supplemental information to accurately predict a future state of an object (e.g., detected in sensor data) within a vicinity of an ego vehicle. An autonomous or semi-autonomous system of the ego vehicle can receive the predicted state and execute an appropriate responsive action, for example, such as provide an alert to the driver/occupant, slow down the vehicle, execute an evasive maneuver, etc.

Generally, an object tracking system according to the disclosed embodiments uses one or more sensors (e.g., camera, lidar, radar, etc.) to detect discrete states of an object over a period of time and, combined with one or more types of supplemental information, generate a predicted state of the object. For example, in one or more embodiments the sensors may detect, at a plurality of discrete times [t−2, t−1, t, . . . ], a respective plurality of locations [$x_{t-2}$, $x_{t-1}$, $x_t$ . . . ] (i.e., example states) of an object in a vicinity of the ego vehicle. The plurality of locations at the plurality of discrete times can be referred to as observation data and may be logged in a historical manner, i.e., extending from a present time t to a previous time t−n some point in the past.

In one or more embodiments, the object tracking system may use information that existed prior to sensor observations at a current time to determine an initial estimate of a state of a detected object. The initial estimate may be referred to as a "prior," and an ongoing estimation may be referred to as a "belief." For example, if the ego vehicle is traveling on a highway that has a speed limit of 65 mph, the object tracking system can determine a belief regarding the physical state of the object (e.g., its position and velocity) based in part on the environment and the speed limit. An example of such prior information may be that a moving object detected within a lane of the highway is traveling at a speed within a range of 50 mph and 70 mph.

In one or more embodiments, the disclosed object tracking system can execute a prediction operation to further refine the belief toward a more accurate belief. For example, the prediction operation can receive as input the observation data and the belief. The prediction operation can output a probability regarding one or more states of the object at a future time t+n. For example, in one implementation the prediction operation may receive the plurality of locations at which the object was detected at the plurality of discrete times, the prior belief that the vehicle is traveling no faster than 70 mph, and output a probability distribution that indicates the object is most likely traveling at a speed of 67 mph and will be at a location x at time t+1.

In one or more embodiments, the disclosed object tracking system can obtain one or more types of supplemental information associated with an environment of the present location of the ego vehicle. The disclosed object tracking system can determine an impact on the prediction distribution based on the supplemental information and adjust the prediction accordingly.

For example, in one or more embodiments the supplemental information can include a high definition map having at least a first area characterized by a relatively high degree of information and a second area characterized by a relatively low degree of information as compared to the first area. The supplemental information can be associated with a predefined impact effect applied to on one or more aspects of the state of the object. In one or more embodiments, the predefined impact effect is a speed reduction factor that can include one or more values stored in a database, lookup table or the like, associated with areas of the map that have a relatively low quality of information. The speed reduction factor can model the effect of an autonomous vehicle slowing down as it travels into areas with reduced mapping information.

Thus, for example, the disclosed object tracking system can apply a speed reduction factor to the probability distribution results when the object is detected entering the second area. Based on the speed reduction factor, the object tracking system determines a probability distribution that indicates the object will most likely reduce traveling speed to 64 mph and will be at a different location x' at time t+1 instead of location x.

The disclosed object tracking system can confirm the accuracy of the adjusted prediction based on subsequent data obtained by the sensors that indicate the actual location of the object at time t+1. In one or more embodiments, the system can modify the prediction operation based at least in part on the belief state, for example, by including the state in the observation data or by adjusting the prediction operation or the effect of the supplemental information to produce a more accurate result in subsequent predictions.

Note that the supplemental information is not limited to map information, which is only one example type of supplemental information that the disclosed embodiments can take into account. The disclosed object tracking system can utilize many other types of supplemental information, as will be discussed further below.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of powered transport or vehicle that, for example, may utilize object tracking and state predictions and thus can benefit from the functionality discussed herein.

As shown in FIG. 1, the vehicle 100 includes multiple elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2-5 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 100 includes a sensor system 120 and an object tracking system 170 that functions to utilize supplemental information to generate a prediction regarding a future state of an object detected, by the sensor system 120, within a vicinity of the vehicle 100. Moreover, while depicted as a standalone component, in one or more embodiments, the object tracking system 170 can be integrated with another component of the vehicle 100, such as the autonomous driving module 160 or other drive control system of the vehicle 100. The noted functions and methods will become more apparent in the following discussion of the figures.

Figure 2:
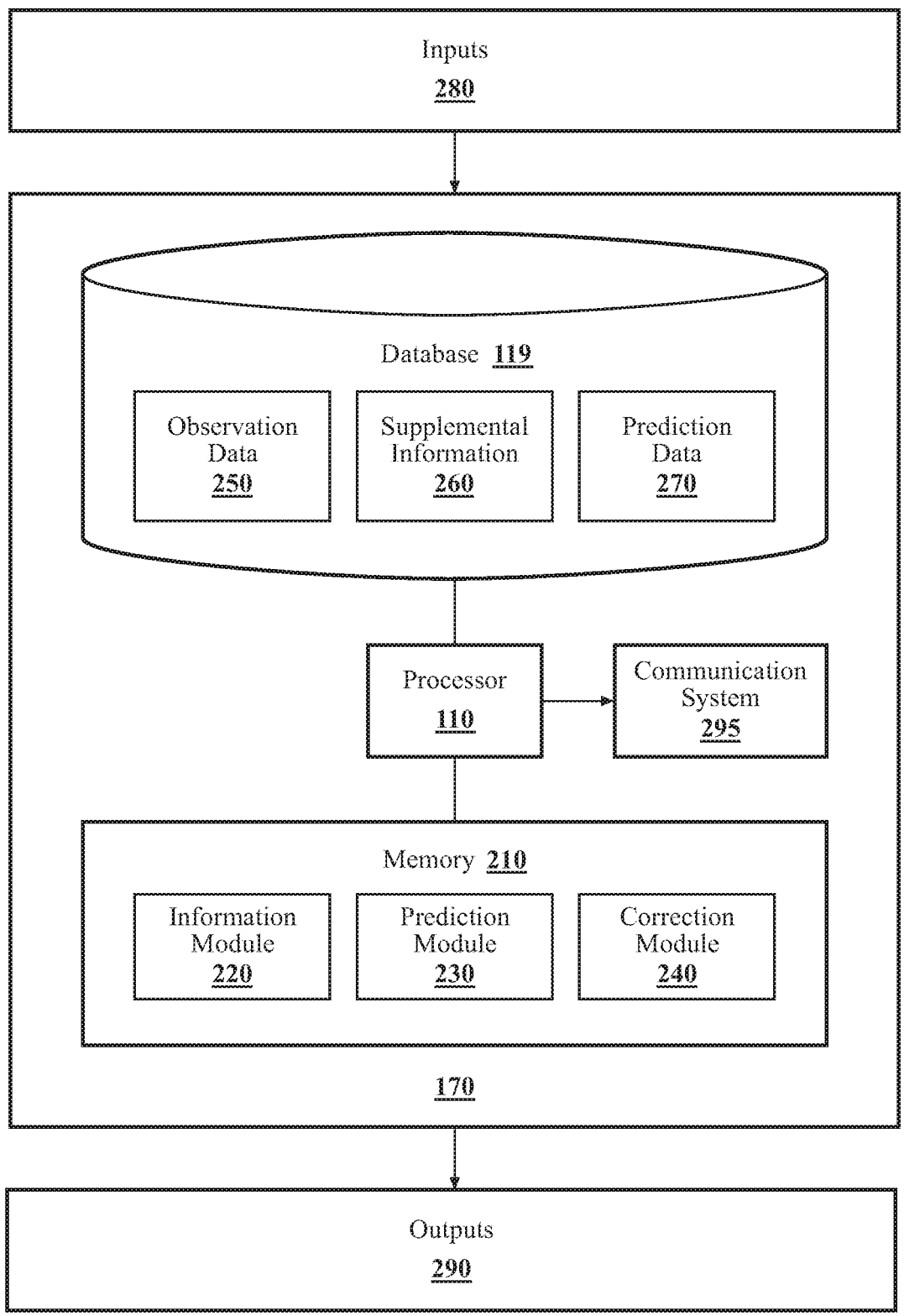
FIG. 2 illustrates one embodiment of an object tracking system, according to the disclosed embodiments.

With reference to FIG. 2, one embodiment of a vehicular implementation of the object tracking system 170 of FIG. 1 is illustrated. The object tracking system 170 is shown as including a processor 110 and database 119 from the vehicle 100 of FIG. 1. Accordingly, the processor 110 may be a part of the object tracking system 170, the object tracking system 170 may include a processor separate from the processor 110 of the vehicle 100 or the object tracking system 170 may access the processor 110 through a data bus or another communication path.

The object tracking system 170 includes a database 119 that stores, among other things, observation data 250 (e.g., data obtained from the sensor system 120), supplemental information 260 (e.g., map information, sun position information, hill grade information, visual obstruction information, etc.), and prediction data 270 (e.g., present and past state predictions for detected objects), as will be discussed further below. The database 119, in one embodiment, is constructed as an electronic data structure stored in the memory 210 or another data store, such as the vehicle 100 data store 115, a cloud-based storage, a removable memory device, or another suitable location that is accessible to the modules 220, 230, and 240. The database 119 is configured with routines that can be executed by the processor 110 for analyzing stored data, providing stored data, organizing stored data, and so on. Thus, in one embodiment, the database 119 stores data described above (as well as other data) used by the modules 220, 230, and 240 in executing various functions.

Additionally, the object tracking system 170, in one or more embodiments, includes a memory 210 that stores an information module 220, a prediction module 230, and a correction module 240. The memory 210 can be constructed as a random-access memory (RAM), read-only memory (ROM), a hard-disk drive, a flash memory, or other suitable memory for storing the modules 220, 230 and 240. The modules 220, 230 and 240 are, for example, constructed as computer-readable instructions that when executed by the processor 110 cause the processor 110 to perform the various functions disclosed herein.

The object tracking system 170 can include a communication system 295 to communicate with external computing devices, for example, to retrieve supplemental information 260 as will be discussed further below. The communication system 295 can be implemented as, for example, a wireless communication system including one or more transmitting/receiving devices, one or more transmitting/receiving antennas and a controller for transmitting and receiving data over a wireless network using any of a variety of protocols, such as vehicle-to-everything (V2X), general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), Wibree, and/or any other wireless protocol. In one or more embodiments, the communication system 295 can be configured to receive data from one or more external entities, such as other vehicles, stationary cameras, satellites, information servers, etc.

The object tracking system 170 can receive various inputs 280 and process and/or store the inputs 280, for example, as observation data 250, supplemental information 260, and prediction data 270. The observation data 250 can include data obtained from the vehicle sensor system 120 indicating multiple detected states of an object detected in a vicinity of the vehicle 100 at multiple points in time. For example, in one or more embodiments the detected states can include location and the observation data 250 can accordingly include a plurality of locations $[x_{t-2}, x_{t-1}, x_t, \ldots]$ of the object, with the plurality of locations being obtained, respectively, at a plurality of discrete times $[t-2, t-1, t, \ldots]$.

The supplemental information 260 can include, for example, different types of data that provide contextual information about an environment around the vehicle 100 (several examples will be discussed below) and parameters that indicate application thresholds (e.g., such as map location coordinates) and effect factor values (e.g., such as speed reduction factors, as discussed below). The prediction data 270 can include, for example, current and past predicted states (e.g., speed, location, behavior, etc.) of the detected object.

The information module 220 is generally constructed including instructions that function to control the processor 110 to obtain, based at least in part on a present location of the vehicle 100, supplemental information 260, associated with an environment of the present location. In one or more embodiments, the supplemental information 260 provides contextual information about an environment or region that the vehicle 100 is presently in or approaching and indicates at least a speed reduction factor associated with objects detected in the environment or region. In one or more embodiments, the information module 220 can obtain the location of the vehicle 100 from a GPS associated with the vehicle 100 (e.g., from the navigation system 147), and can obtain the supplemental information 260 from one or more sources, such as the stored map data 116, from an external source (e.g., a third party service, publicly accessible webservers, etc.) accessed via the communication system 295, or other sources.

The prediction module 230 is generally constructed including instructions that function to control the processor 110 to execute a prediction operation to determine a predicted state of a detected object at a future point in time t+1 based at least in part on the observation data 250 and supplemental information 260. In one or more embodiments, the prediction module 230 can execute a prediction algorithm, such as a Baysian filter, Kalman filter, Markov models, particle filter, or the other state estimation and prediction algorithms, to determine the predicted state based on previous detected states. In one or more embodiments, the prediction algorithm can receive as input the observation data 250 and/or a belief associated with the state of the object and output the predicted state. The object tracking system 170 can store the predicted state as historical prediction data 270 and, after any modifications as discussed further below, output the predicted state as a system output 290, for example, to another system of the vehicle 100, such as the autonomous driving module 160 or a user interface of the vehicle 100.

The correction module 240 is generally constructed including instructions that function to control the processor 110 to determine an actual state of the object at a time t+1 based on data from the sensor system 120, and to modify the prediction operation of the prediction module 230 based at least in part on the actual state. In this manner, future predictions of the prediction module 230 can improve in accuracy.

Figure 3:
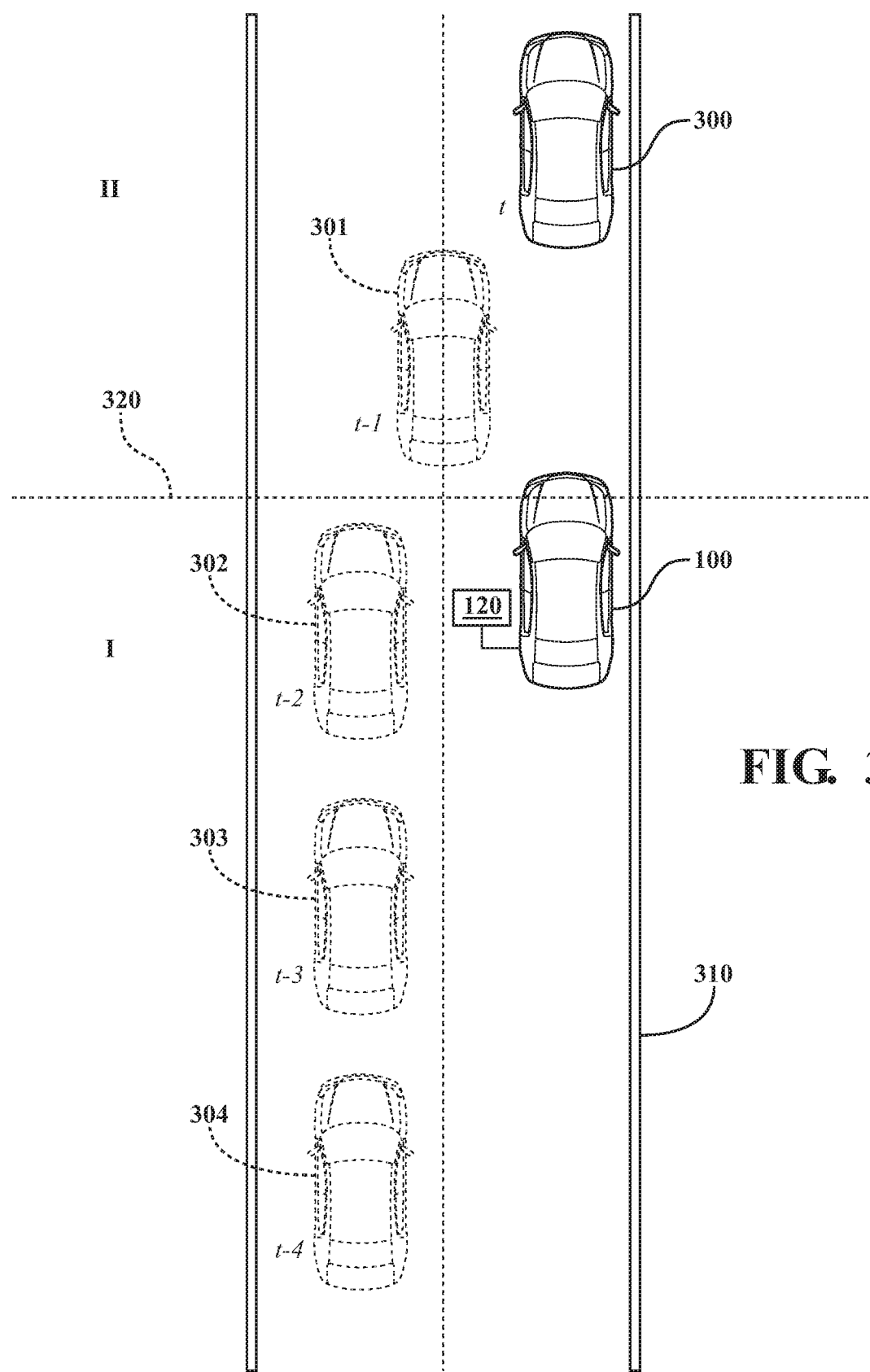
FIG. 3 illustrates an example situation in which the disclosed embodiments can be implemented to predict a state of an object in a vicinity of the vehicle, according to the disclosed embodiments.

FIG. 3 illustrates an example situation in which the disclosed embodiments can be implemented to predict a state of an object in a vicinity of the vehicle 100. In this example, the vehicle 100 and a second vehicle 300 are traveling on a highway 310. The second vehicle 300 approaches the vehicle 100 from the rear, passes the vehicle 100, and changes lanes to move in front of the vehicle 100. The sensor system 120 detects and tracks the second vehicle 300, and the object tracking system 170 stores observation data 250 indicating multiple states, in this case, including a plurality of locations (301, 302, 303, 304) of the second vehicle 300 at a plurality of discrete times (t−1, t−2, t−3, t−4).

The information module 220 determines a location of the vehicle 100 (e.g., a GPS location, a geographic region, a street address, etc.) and obtains supplemental information 260 associated with the location. Generally, the supplemental information 260 indicates an impact factor that is associated with an area and can affect a state of an object that is either within the area or entering the area.

For example, in one or more embodiments the supplemental information 260 can include a high definition map having a first area characterized by a high degree of information and a second area characterized by a low degree of information. In this case, in FIG. 3 area I represents the first area and area II represents the second area, with first area I and second area II sharing a border 320. The supplemental information 260 can further include a speed reduction factor associated with entering the second area II, representing an effect of an autonomous vehicle (AV) slowing down when entering a region for which the AV has less information to assist in navigation. In one or more embodiments, the speed reduction factor can be a predetermined percentage reduction value (e.g., 10%, 15%, etc.) applied to speed/trajectory predictions of objects detected entering the second area II.

While map information as described above is one type of supplemental information 260, in one or more embodiments the information module 220 can obtain different types of supplemental information 260. As another example type, in one or more embodiments the supplemental information 260 can include sun position (e.g., based on time of day and geographic location, or based on sensor data or the like) and sun visibility information. For example, referring to FIG. 3, the information module 220 can determine that from the perspective of area II the sun is positioned substantially within the line of travel of the highway 310 and highly visible (e.g., little or no clouds or other obstructions to sunlight). In one or more embodiments, the vehicle sensor system 120 can detect a level of visibility of sunlight in the area II. In this case, the prediction module 230 can apply a speed reduction factor to a predicted state of a detected vehicle based at least in part on determining the sun position as being in a direction of travel of the object and the sun visibility (e.g., amount of detected sunlight in lumens) being above a threshold amount. The speed reduction factor can be a predetermined value (e.g., 15%, etc.), for example, based on data studies that indicate how much a driver typically slows down when driving into sunlight.

As another example type of supplemental information 260, in one or more embodiments the supplemental information 260 can include information indicating a tertiary object detected by the sensor system 120 or indicated in map data. In this case, the prediction module 230 can include instructions to predict a travel path for the second vehicle based at least in part on the observation data 250 (e.g., the detected plurality of locations of the second vehicle at discrete times) and apply a speed reduction factor to a predicted state of a second vehicle when the tertiary object is detected within the predicted travel path of the second vehicle.

In yet another example type of supplemental information 260, in one or more embodiments the supplemental information 260 can include data indicating one or more environmental conditions detected by the sensor system 120, such as rain, snow, hail, fog, etc. In this case, the prediction module 230 can apply a speed reduction factor to a predicted state of a detected vehicle based at least in part on determining that the environmental condition exceeds a predetermined threshold.

In still another example type of supplemental information 260, in one or more embodiments the supplemental information 260 can include data indicating one or more geographical occlusion features detected by the sensor system 120, such as an upcoming hill, an upcoming sharp turn around occluding objects such as trees, or the like. In this case, the prediction module 230 can apply a speed reduction factor to a predicted state of a detected vehicle based at least in part on determining the second vehicle is approaching the one or more geographical occlusion features.

The above discussed examples of different types of supplemental information 260 that the discloses object tracking system 170 can utilize is not exhaustive. Other types of supplemental information 260 may be utilized in different implementations, and multiple types of supplemental information 260 can be combined depending upon the circumstances.

In any case, the prediction module 230 executes a prediction operation to determine a predicted state of the second vehicle 300 based on the observation data 250 and the supplemental information 260. In one or more embodiments, the prediction operation can be implemented as a Baysian filter operation, a particle filter operation, a Kalman filter operation, or the like. In one or more embodiments, the prediction module 230 incorporates the supplemental information 260 into the prediction operation. In one or more embodiments, the prediction module 230 modifies the prediction operation output based at least in part on the supplemental information 260.

Figure 4:
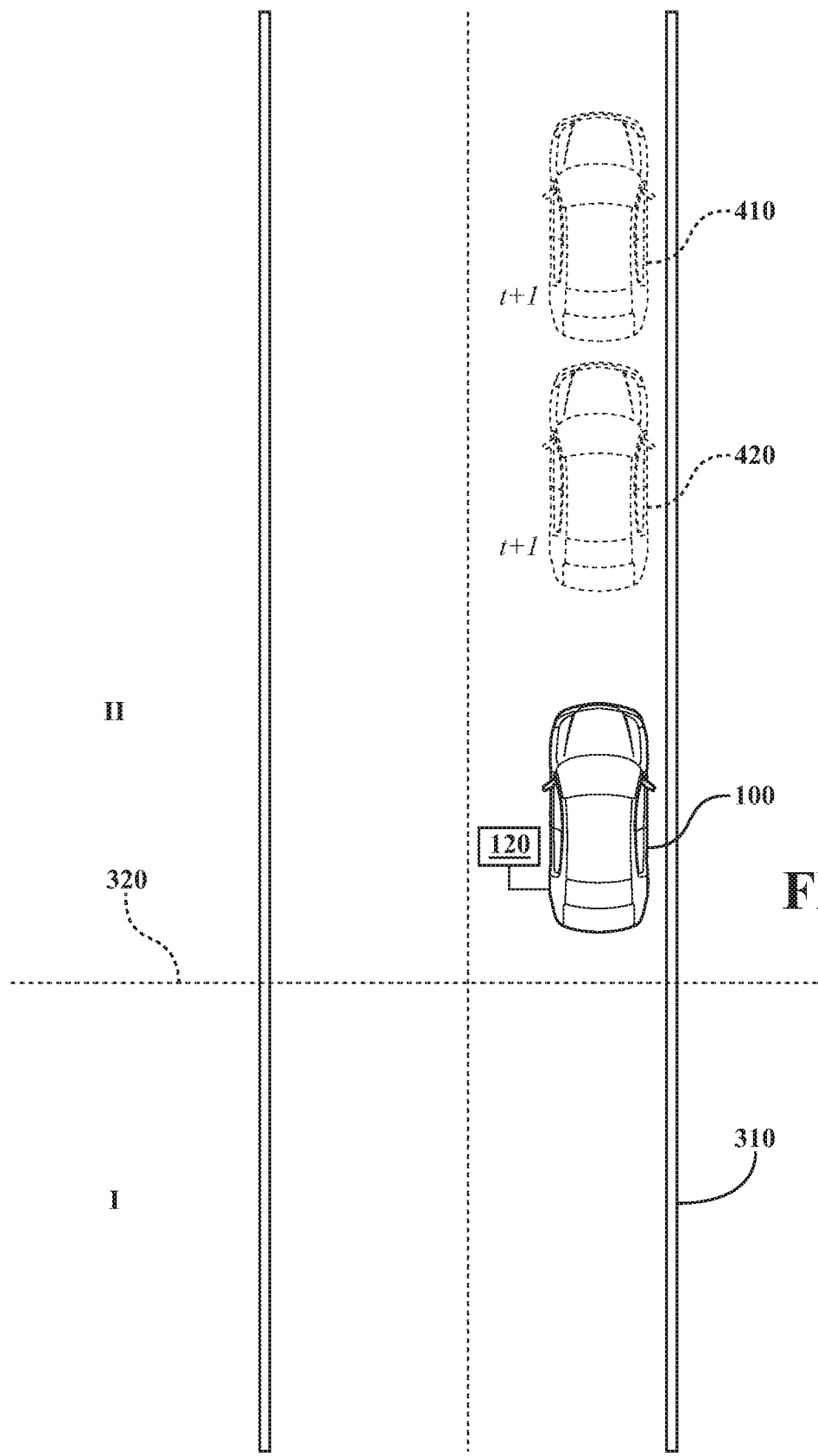
FIG. 4 illustrates an example of determining an initial prediction of a state and modified prediction of a state, according to the disclosed embodiments.

FIG. 4 illustrates an example of the prediction module 230 determining an initial prediction 410 of a state of the second vehicle 300 at future time t+1 based on the observation data 250. In one or more embodiments, the prediction module 230 may determine a belief associated with the state of the second vehicle and determine the prediction 410 based on the belief and the observation data 250. The information module 220 obtains supplemental information 260 indicating, for example, that the second vehicle has entered an area II that has a relatively low amount of map information (e.g., the road 310 is entering a new development area that is not well mapped, or an area of low travel that is not well mapped, etc.). Based on the supplemental information 260, the prediction module 230 applies a speed reduction factor to determine a modified predicted location 420.

In one or more embodiments, rather than determine a modified predicted state, the prediction module 230 can use the supplemental information 260 to decrease or increase a level of certainty associated with a predicted state.

The object tracking system 170 can output the predicted state and, when applicable, a certainty level associated with the predicted state. Any of various other systems in the vehicle 100 can make use of the predicted state. For example, the autonomous driving module 160 can cause the vehicle 100 to slow down based on the predicted state, or an interface system can provide an alert based on the predicted state, etc.

The correction module 240 can obtain information indicating the actual state of the second vehicle at time t+1 and modify an operation of the prediction module 230 based at least in part on the actual state. For example, in one or more embodiments the correction module 240 can modify the prediction algorithm itself, update the observation data 250 to include the new actual state, modify the impact factor (e.g., the speed reduction value) used to modify the predicted state, or any combination thereof, depending on the type of prediction operation and type of supplemental information 260 used to generate the prediction. In any case, the correction can increase the accuracy of future predictions.

Thus, the object tracking system 170 can provide increasingly accurate predictions regarding a future state of an object detected in a vicinity of the vehicle. Although the predicted state examples provided above relate to position, other aspects of the agent's state, such as speed, acceleration, braking, deceleration, measurable traits/tendencies etc., can be predicted. Additional and optional features of the object tracking system 170 will be discussed below.

Figure 5:
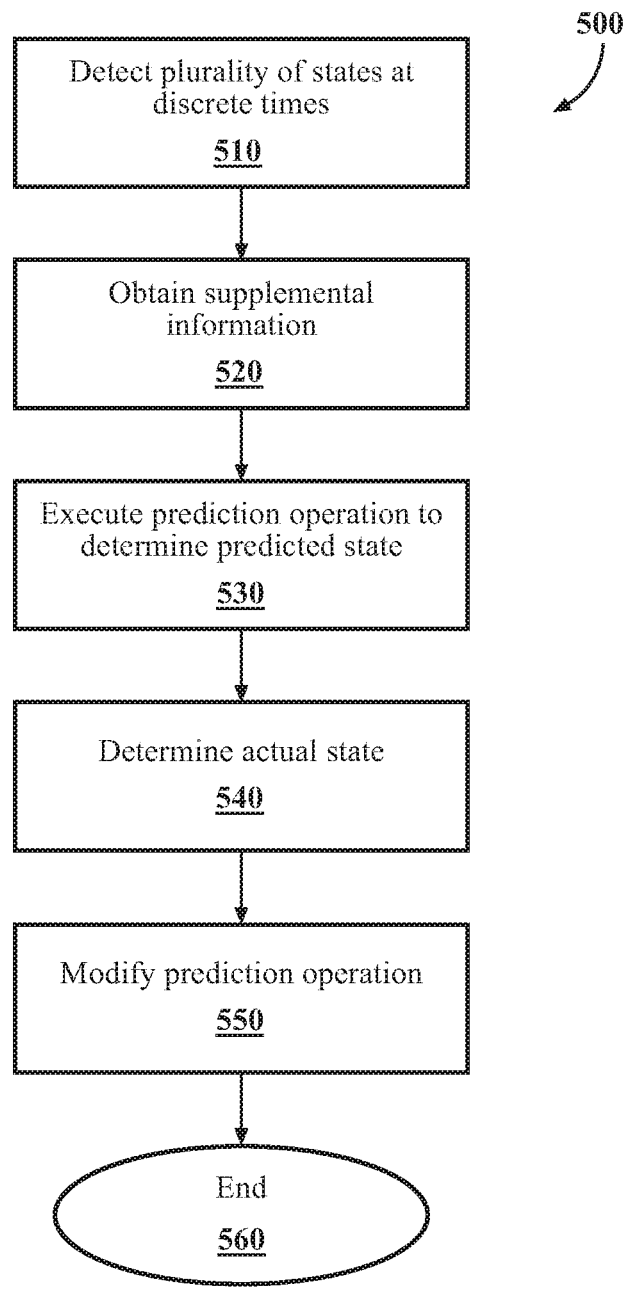
FIG. 5 illustrates an example flowchart of operations of an object tracking system, according the disclosed embodiments.

FIG. 5 illustrates a flowchart of a method 500 of predicting a state of a detected object according to the disclosed embodiments. Method 500 will be discussed from the perspective of the object tracking system 170 of FIGS. 1 and 2. While method 500 is discussed in combination with the object tracking system 170, it should be appreciated that the method 500 is also not limited to being implemented within the object tracking system 170 but is instead one example of a system that may implement the method 500.

At operation 510, the object tracking system 170 detects, at a plurality of discrete times [t, t−1, t−2, . . . ], a respective plurality of states of an object in a vicinity of the vehicle 100. The states can be determined based on data obtained from the vehicle sensor system 120. The states can include, for example, one or more of discrete locations or positions of the object, speed or acceleration/deceleration measurements of the object, one or more other measurable traits/behaviors of the object, or the like. The plurality of states can be stored in an ongoing basis over time as observation data 250.

At operation 520, the object tracking system 170 (e.g., information module 220) can obtain, based at least in part on a present location of the vehicle, supplemental information 260 associated with an environment of the present location. Any of various types of supplemental information 260 can be obtained, for example, depending on the context of the present location.

At operation 530, the object tracking system 170 (e.g., prediction module 230) can execute a prediction operation to determine a predicted state of the object at a time t−1 based at least in part on the detected plurality of states, the supplemental information 260, and in some cases, an initial belief or "prior" associated with the state to be predicted. In one or more embodiments, the prediction operation can be implemented as a Baysian filter operation, a particle filter operation, a Kalman filter operation, or the like. The exact determination of the prediction can depend on the type of prediction operation, the type of supplemental information 260 that is available and the type of impact factor that is associated with the supplemental information 260.

For example, in one or more instances the supplemental information 260 can indicate at least a speed reduction factor associated with the present location. As an example, in one implementation the supplemental information can include a high definition map having a first area characterized by a high degree of information and a second area characterized by a low degree of information, and the predicted state includes at least a speed of the object. In this case, the supplemental information 260 can include instructions for the prediction module 230 to apply the speed reduction factor to the predicted state when the object is determined to be entering the second area.

As another example, the supplemental information 260 can include sun position and sun visibility information. In this case, the supplemental information 260 can include instructions for the prediction module 230 to instructions to apply the speed reduction factor to the predicted state based at least in part on determining the sun position as being in a direction of travel of the object and the sun visibility is above a threshold amount.

As discussed above, various different types of supplemental information 260 and associated impact factors may be applied by the prediction module 230 to determine the predicted state.

At operation 540, the object tracking system 170 (e.g., the correction module 240) can determine an actual state of the object at a time t+1 based on data from the sensor system 120.

At operation 550, the object tracking system 170 (e.g., the correction module 240) can improve the accuracy of future predictions by doing one or more of: modifying the prediction operation itself, updating the observation data 250 with the actual state of the object, or modifying the impact factor associated with the supplemental information 260.

At operation 560, object tracking system 170 stores the predicted state as prediction data 270 and outputs the predicted state (e.g., to the autonomous driving module 160) and the process ends.

Accordingly, the disclosed object tracking system 170 can determine a predicted state for a detected object with improved accuracy by utilizing supplemental information and can further track and increase the accuracy of future predictions.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, traffic control devices, road markings, structures, obstructions, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high definition, high quality and/or highly detailed in one or more areas, and have one or more areas that have less detail, information or quality than the one or more high quality areas.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself, such as one or more actual states of the vehicle 100 as discussed above. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126, e.g., one or more monocular cameras. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger).

The vehicle 100 can include an output system 135. An "output system" includes any device, component, or arrangement or groups thereof that enable information/data to be presented to a vehicle passenger (e.g., a person, a vehicle passenger, etc.). The output system 135 can function as part of an interface that can present, for example, predicted states of detected objects.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. One or more of these systems can be operably connected to wheels of the vehicle in a manner that allows individual application of control or commands implemented by the respective system.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the object tracking system 170, and/or the autonomous driving module(s) 160 can be operatively connected to communicate with the various vehicle systems 140 and/or individual components thereof. For example, returning to FIG. 1, the processor(s) 110, the object tracking system 170, and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110, the object tracking system 170, and/or the autonomous driving module(s) 160 may be operable to communicate with and/or control the navigation and/or maneuvering of the vehicle 100 by controlling one or more of the vehicle systems 140 and/or components thereof.

For instance, when operating in an autonomous mode, the processor(s) 110 and/or the autonomous driving module(s) 160 can control the direction and/or speed of the vehicle 100 in response to or based at least in part on predicted states of objects as provided by the object tracking system 170. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities. The object tracking system 170 can determine one or more actuation commands for one or more of the actuators 150 on a per wheel basis, as discussed above.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the object tracking system 170 can be configured to determine travel path(s) and determine current autonomous driving maneuvers for the vehicle 100, future autonomous driving maneuvers and/or modifications to current autonomous driving maneuvers based on data and/or predictions acquired by the sensor system 120 and/or object tracking system 170, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement a variety of driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An object tracking system for a vehicle, for predicting a state of an object, comprising:
   one or more processors;
   a memory, communicably connected to the one or more processors and storing:
      an information module including instructions that when executed by the one or more processors cause the one or more processors to obtain, based at least in part on a present location of the vehicle, supplemental information, associated with an environment of the present location, that indicates at least a speed reduction factor;
      a prediction module including instructions that when executed by the one or more processors cause the one or more processors to:
         determine a predicted state of the object at a time t+1 based at least in part on a plurality of states, at a plurality of discrete times, of the object, and the supplemental information, the object being in a vicinity of the vehicle, the plurality of states being detected by one or more sensors, the supplemental information including a high definition map having a first area characterized by a high degree of information and a second area characterized by a low degree of information, and the predicted state indicating at least a speed of the object; and
         apply the speed reduction factor to the predicted state in response to a receipt of a detection, by the one or more sensors, that the object has entered the second area; and
      a correction module including instructions that when executed by the one or more processors cause the one or more processors to determine an actual state of the object at a time t+1 based on data from the one or more sensors, and to modify an operation of the prediction module based at least in part on the actual state.

2. The object tracking system of claim 1,
   wherein the supplemental information further includes information about at least one of a sun position or a sun visibility, and
   wherein the prediction module further includes instructions to apply the speed reduction factor to the predicted state based at least in part on a determination that the sun position is in a direction of travel of the object or the sun visibility is above a threshold amount.

3. The object tracking system of claim 1,
   wherein the supplemental information further includes information about a second object detected by the one or more sensors, and
   wherein the prediction module further includes instructions to predict a travel path for the object based at least in part on the plurality of states and to apply the speed reduction factor to the predicted state in response to a receipt of a detection that the second object is within the travel path of the object.

4. The object tracking system of claim 1,
   wherein the supplemental information further includes information about one or more environmental conditions detected by the one or more sensors, and
   wherein the prediction module further includes instructions to apply the speed reduction factor to the predicted state in response to the information about the one or more environmental conditions including an indication of a presence of precipitation above a threshold amount.

5. The object tracking system of claim 1,
   wherein the supplemental information further includes information about one or more geographical occlusion features detected by the one or more sensors, and
   wherein the prediction module includes instructions to apply the speed reduction factor to the predicted state in response to a receipt of a detection that the object is approaching the one or more geographical occlusion features.

6. The object tracking system of claim 1, wherein the instructions to determine the predicted state of the object include instructions to execute one or more of a Bayesian filtering cycle, a Kalman filter, or a particle filter to predict the state of the object.

7. The object tracking system of claim 5, wherein the one or more geographical occlusion features include at least one of a hill or a sharp turn around an occluding object.

8. A method for predicting a state of an object detected within a vicinity of a vehicle, comprising:
   obtaining, based at least in part on a present location of the vehicle, supplemental information, associated with an environment of the present location, that indicates at least a speed reduction factor;
   executing a prediction operation to determine a predicted state of the object at a time t+1 based at least in part on a plurality of states, at a plurality of discrete times, of the object, and the supplemental information, the object being in the vicinity of the vehicle, the plurality of states being detected, the supplemental information including a high definition map having a first area characterized by a high degree of information and a second area characterized by a low degree of information, and the predicted state indicating at least a speed of the object;
   applying the speed reduction factor to the predicted state in response to a receipt of a detection that the object has entered the second area;
   determining an actual state of the object at a time t+1; and
   modifying the prediction operation based at least in part on the actual state.

9. The method of claim 8, wherein the supplemental information further includes information about at least one of a sun position or a sun visibility, and further comprising:
applying the speed reduction factor to the predicted state based at least in part on a determination that the sun position is in a direction of travel of the object or the sun visibility is above a threshold amount.

10. The method of claim 8, wherein the supplemental information further includes information about a second object detected by one or more sensors, and further comprising:
predicting a travel path for the object based at least in part on the plurality of states; and
applying the speed reduction factor to the predicted state in response to a receipt of a detection that the second object is within the travel path of the object.

11. The method of claim 8, wherein the supplemental information further includes information about one or more environmental conditions detected by one or more sensors, and further comprising:
applying the speed reduction factor to the predicted state in response to the information about the one or more environmental conditions including an indication of a presence of precipitation above a threshold amount.

12. The method of claim 8, wherein the supplemental information further includes information about one or more geographical occlusion features detected by one or more sensors, and further comprising:
applying the speed reduction factor to the predicted state in response to a receipt of a detection that the object is approaching the one or more geographical occlusion features.

13. The method of claim 8, wherein the executing the prediction operation to determine the predicted state of the object comprises executing one or more of a Bayesian filtering cycle, a Kalman filter, or a particle filter to predict the state of the object.

14. The method of claim 12, wherein the one or more geographical occlusion features include at least one of a hill or a sharp turn around an occluding object.

15. A non-transitory computer-readable medium for predicting a state of an object detected within a vicinity of a vehicle and including instructions that when executed by one or more processors cause the one or more processors to:
obtain, based at least in part on a present location of the vehicle, supplemental information, associated with an environment of the present location, that indicates at least a speed reduction factor;
execute a prediction operation to determine a predicted state of the object at a time t+1 based at least in part on a plurality of states, at a plurality of discrete times, of the object, and the supplemental information, the object being in the vicinity of the vehicle, the plurality of states being detected, the supplemental information including a high definition map having a first area characterized by a high degree of information and a second area characterized by a low degree of information, and the predicted state indicating at least a speed of the object;
apply the speed reduction factor to the predicted state in response to a receipt of a detection that the object has entered the second area;
determine an actual state of the object at a time t+1; and
modify the prediction operation based at least in part on the actual state.

16. The non-transitory computer-readable medium of claim 15, wherein the supplemental information further includes information about at least one of a sun position or a sun visibility, and further comprising instructions to:
apply the speed reduction factor to the predicted state based at least in part on a determination that the sun position is in a direction of travel of the object or the sun visibility is above a threshold amount.

17. The non-transitory computer-readable medium of claim 15, wherein the supplemental information further includes information about a second object detected by one or more sensors, and further comprising instructions to:
predict a travel path for the object based at least in part on the plurality of states; and
apply the speed reduction factor to the predicted state in response to a receipt of a detection that the second object is within the travel path of the object.

18. The non-transitory computer-readable medium of claim 15, wherein the supplemental information further includes information about one or more environmental conditions detected by one or more sensors, and further comprising instructions to:
applying the speed reduction factor to the predicted state in response to the information about the one or more environmental conditions including an indication of a presence of precipitation above a threshold amount.

19. The non-transitory computer-readable medium of claim 15, wherein the supplemental information further includes information about one or more geographical occlusion features detected by one or more sensors, and further comprising instructions to:
applying the speed reduction factor to the predicted state in response to a receipt of a detection that the object is approaching the one or more geographical occlusion features.

20. The non-transitory computer-readable medium of claim 19, wherein the one or more geographical occlusion features include at least one of a hill or a sharp turn around an occluding object.

* * * * *